(12) United States Patent
Gao et al.

(10) Patent No.: US 10,834,726 B2
(45) Date of Patent: *Nov. 10, 2020

(54) METHOD AND DEVICE FOR PROCESSING SERVICES OF MULTI-CHANNEL TERMINAL

(71) Applicant: SPREADTRUM COMMUNICATIONS (SHANGHAI) CO., LTD., Zhangjiang, Shanghai (CN)

(72) Inventors: Xichun Gao, Shanghai (CN); Xianliang Chen, Shanghai (CN); Yi He, Shanghai (CN); Jinjin Ni, Shanghai (CN); Yiguo Zhao, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 50 days.

This patent is subject to a terminal disclaimer.

(21) Appl. No.: 15/810,734

(22) Filed: Nov. 13, 2017

(65) Prior Publication Data
US 2018/0139748 A1    May 17, 2018

(30) Foreign Application Priority Data
Nov. 14, 2016 (CN) .......................... 2016 1 1003401

(51) Int. Cl.
*H04W 72/04* (2009.01)
*H04L 29/08* (2006.01)
*H04W 76/10* (2018.01)

(52) U.S. Cl.
CPC ........... *H04W 72/048* (2013.01); *H04L 67/32* (2013.01); *H04W 76/10* (2018.02)

(58) Field of Classification Search
CPC ................................................. H04W 72/048
See application file for complete search history.

(56) References Cited

U.S. PATENT DOCUMENTS 8,204,502 B2  6/2012  Khetawat et al.
8,483,759 B2  7/2013  Shi et al.
(Continued)

FOREIGN PATENT DOCUMENTS

CN    101217746 A    7/2008
CN    101795331 A    8/2010
(Continued)

OTHER PUBLICATIONS

USPTO Non-Final Office Action corresponding to U.S. Appl. No. 15/804,524; dated Jun. 1, 2018.
(Continued)

*Primary Examiner* — Samina F Choudhry
(74) *Attorney, Agent, or Firm* — Cantor Colburn LLP (57) ABSTRACT

A method and device for processing services of a multi-channel terminal are provided. The method includes: receiving a service request corresponding to a current subscriber identity card, when the current subscriber identity card is using a first service channel to communicate; establishing a second service channel to communicate, to respond to the service request, wherein the first service channel and the second service channel are both established based on the current subscriber identity card. By the method, the user's demand for implementing two or more routes of communication at the same time can be satisfied, and the user's experience is optimized greatly.

18 Claims, 5 Drawing Sheets

(56) References Cited

U.S. PATENT DOCUMENTS

| | | |
|---|---|---|
| 9,113,450 B2 | 8/2015 | Pelletier et al. |
| 2002/0154632 A1 | 10/2002 | Wang et al. |
| 2004/0229601 A1 | 11/2004 | Zabawskyj et al. |
| 2007/0165646 A1* | 7/2007 | He .................. H04J 3/14 370/395.4 |
| 2009/0100147 A1* | 4/2009 | Igarashi ........ H04N 7/17309 709/218 |
| 2009/0180451 A1 | 7/2009 | Alpert et al. |
| 2010/0027467 A1 | 2/2010 | Wu et al. |
| 2010/0105433 A1 | 4/2010 | Lin et al. |
| 2011/0051685 A1* | 3/2011 | Saitou ................. H04W 36/02 370/331 |
| 2012/0115493 A1 | 5/2012 | Matada et al. |
| 2012/0135715 A1 | 5/2012 | Kang et al. |
| 2012/0142348 A1 | 6/2012 | Park et al. |
| 2013/0316766 A1 | 11/2013 | Nousiainen et al. |
| 2014/0094140 A1 | 4/2014 | Misra et al. |
| 2014/0199961 A1* | 7/2014 | Mohammed ........ H04L 63/0428 455/406 |
| 2014/0351832 A1 | 11/2014 | Cho et al. |
| 2015/0171909 A1* | 6/2015 | Gao ..................... H04B 1/3816 455/558 |
| 2015/0245309 A1* | 8/2015 | Nayak ................ H04W 60/005 455/435.3 |
| 2015/0282013 A1 | 10/2015 | Kim et al. |
| 2015/0327207 A1 | 11/2015 | Bharadwaj |
| 2016/0014579 A1 | 1/2016 | Kasilya Sudarsan et al. |
| 2016/0029274 A1 | 1/2016 | Ng et al. |
| 2016/0105901 A1* | 4/2016 | Lu ...................... H04W 72/10 370/329 |
| 2016/0183238 A1 | 6/2016 | Buthler |
| 2016/0278128 A1 | 9/2016 | Krishnamurthy |
| 2016/0381710 A1 | 12/2016 | Bansal et al. |
| 2017/0105193 A1 | 4/2017 | Liu et al. |
| 2017/0118255 A1 | 4/2017 | Tsai et al. |
| 2018/0063881 A1 | 3/2018 | Shah et al. |
| 2018/0131402 A1 | 5/2018 | He et al. |
| 2018/0132097 A1 | 5/2018 | Ni et al. |

FOREIGN PATENT DOCUMENTS

| | | |
|---|---|---|
| CN | 101951653 A | 1/2011 |
| CN | 103281797 A | 9/2013 |
| CN | 104717720 A | 6/2015 |
| CN | 105722060 A | 6/2016 |
| CN | 105722140 A | 6/2016 |

OTHER PUBLICATIONS

USPTO Non-Final Office Action corresponding to U.S. Appl. No. 15/804,494; dated Jul. 9, 2018.
USPTO Non-Final Office Action corresponding to U.S. Appl. No. 15/804,494; dated Feb. 28, 2019.
SIPO First Office Action corresponding to Application No. 201611003401.8; dated Sep. 27, 2019.
SIPO First Office Action corresponding to Application No. 201610981611.8; dated Oct. 8, 2019.
U.S. Final Office Action for U.S. Appl. No. 15/804,494 dated Mar. 25, 2020.
CNIPA Second Office Action corresponding to CN Application No. 201610981611.8 dated Feb. 3, 2020.

* cited by examiner

METHOD AND DEVICE FOR PROCESSING SERVICES OF MULTI-CHANNEL TERMINAL

CROSS-REFERENCE TO RELATED APPLICATIONS

The present invention claims priority under 35 U.S.C. § 119 to Chinese Patent Application No. 201611003401.8, filed on Nov. 14, 2016, the entire content of which is incorporated herein by reference.

TECHNICAL FIELD

The invention generally relates to communication technology field, and specifically relates to a method and device for processing services of a multi-channel terminal.

BACKGROUND

With the increasing improvement of mobile network bandwidth, and the continuous optimization of upload/download rate, currently, communications between terminals mainly includes multiple traditional related services based on data, such as a voice communication, a video communication, and the like.

The existing terminal communication control strategy can only allow one phone call in a communication state, if a new phone call request is received by the mobile phone during the communicating, or another phone call is desired to be made by an user simultaneously, the existing technology can't meet this new communication request ideally.

At the present stage, in most cases, if the terminal receives another phone call request while the user is talking on the terminal, the existing terminal can only meet the user's demand for the second phone call by holding the first communication, which greatly affects the user's operating experience.

SUMMARY

Embodiments of the present disclosure provide a method to solve the problem that the existing technology can't implement communications in all multi-channels which are in an active state simultaneously, which is unfavorable to the operation experience of the user's daily communication.

In an embodiment, a method for processing services of a multi-channel terminal is provided, including: receiving a service request corresponding to a current subscriber identity card, when the current subscriber identity card is using a first service channel to communicate; establishing a second service channel to communicate, in response to the service request, wherein the first service channel and the second service channel are both established based on the current subscriber identity card.

Optionally, the first service channel may remain in an active state when the second service channel is established to communicate.

Optionally, the first service channel and the second service channel may be established based on a same service access mode.

Optionally, the service request may include a mobile terminated call service request for the current user or a mobile originated call service request initiated by the current user, wherein the current user is identified by the current subscriber identity card.

Optionally, services the service request for may include a voice service or a video service.

Optionally, the service request may include a service request based on an IMS network, wherein services the service request for and services the first service channel corresponds to both include a service based on the IMS network.

Optionally, services the service request for may include a VoLTE service or a VoWIFI service.

Optionally, the first service channel and the second service channel may transmit a service data based on a data channel, which is established based on a wireless network.

Optionally, the data channel may be a data channel based on the IMS network.

Optionally, the data channel based on the IMS network may include a channel corresponding to an IMS PDN.

Optionally, the first service channel and the second service channel may correspond to different ports of the data channel.

In an embodiment, a device for processing services of a multi-channel terminal is provided, including: a receiving circuitry, configured to receive a service request corresponding to a current subscriber identity card, when the current subscriber identity card is using a first service channel to communicate; an establishment circuitry, configured to establish a second service channel to communicate, to respond to the service request, wherein the first service channel and the second service channel are both established based on the current subscriber identity card.

Optionally, the first service channel may remain in an active state when the establishment circuitry establishes the second service channel to communicate.

Optionally, the first service channel and the second service channel may be established based on a same service access mode.

Optionally, the service request may include a mobile terminated call service request for the current user or a mobile originated call service request initiated by the current user, wherein the current user is identified by the current subscriber identity card.

Optionally, services the service request for include a voice service and a video service.

Optionally, the service request may include a service request based on an IMS network, wherein services the service request for and services the first service channel corresponding to both include a service based on the IMS network.

Optionally, services the service request for may include a VoLTE service or a VoWIFI service.

Optionally, the first service channel and the second service channel may transmit a service data based on a data channel, wherein the data channel is established based on a wireless network.

Optionally, the data channel may be a data channel based on the IMS network.

Optionally, the data channel based on the IMS network may include a channel corresponding to an IMS PDN.

Optionally, the first service channel and the second service channel may correspond to different ports of the data channel.

Compared with the existing technology, embodiments of the present disclosure may provide following advantages.

The terminal receives a service request corresponding to a current subscriber identity card, and responds the service request to establish a second service channel to communicate, when the current subscriber identity card is using a first service channel to communicate, wherein the first service channel and the second service channel are both established based on the current subscriber identity card. Compared with the existing service processing method which the terminal can only maintain one service channel in the active state at a same time, one subscriber identity card can establish at least two of service channels and keep them in the active state at the same time according to embodiments of the present disclosure, which consequently meets the user's demand for implementing two or more routes of communication at the same time, and optimizes the user's experience greatly.

Further, the service request includes a mobile terminated call service request for the current user or a mobile originated call service request made by the current user. Wherein the current user is identified by the current subscriber identity card.

DETAILED DESCRIPTION

Figure 1:
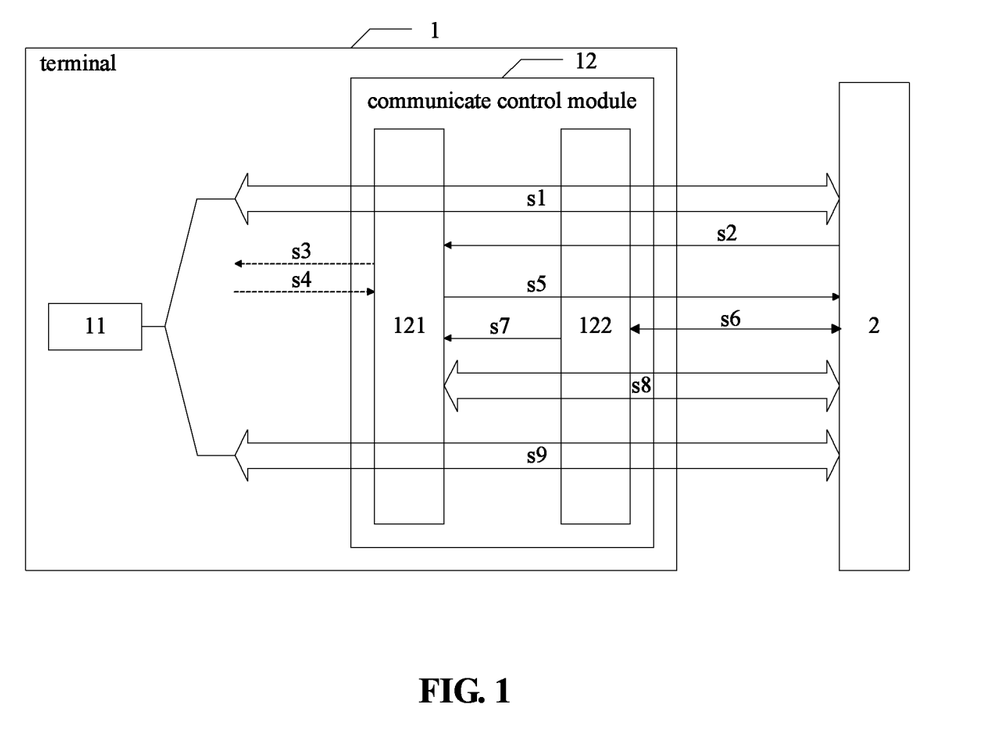
FIG. 1 schematically illustrates a typical scene diagram for a method for processing downlink multi-service requests according to the existing technology.
Figure 2:
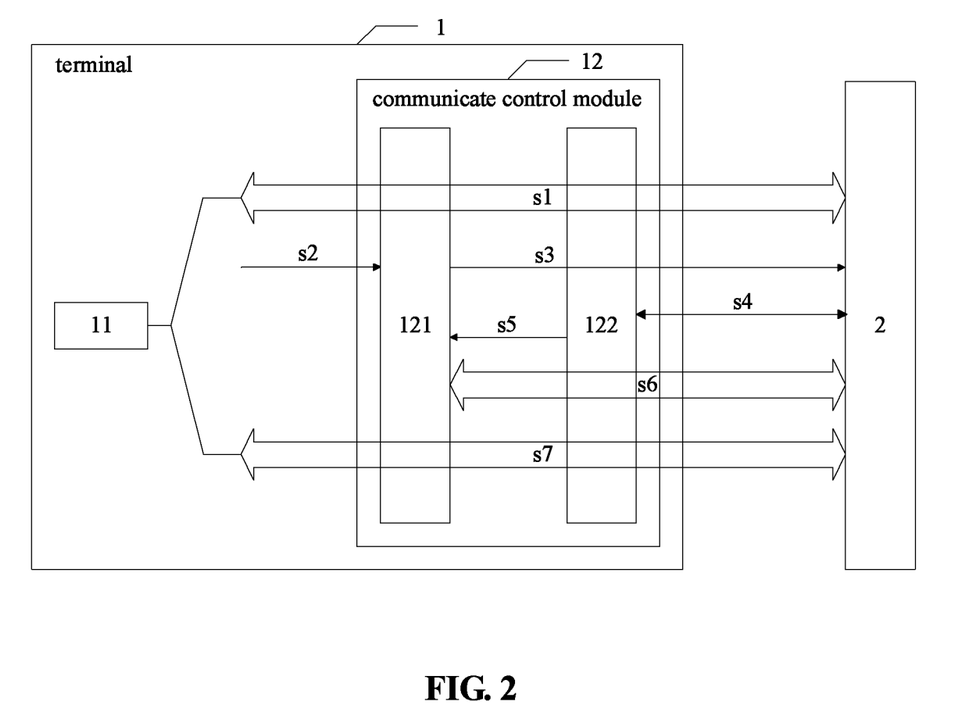
FIG. 2 schematically illustrates a typical scene diagram for a method of processing uplink multi-service requests according to the existing technology.

Those skilled in the art can understand that, as we illustrated in the background, embodiments shown in FIG. 1 and FIG. 2 are mostly implemented to process a terminal service in existing technologies.

Specifically, FIG. 1 schematically illustrates a typical scene diagram for a method for processing downlink multi-service requests according to the existing technology, wherein, the downlink can be a mobile terminated call service request for a user (not shown in the FIG. 1), and the user is identified by a subscriber identity card 11. In this embodiment, the terminal 1 is based on a fact that the subscriber identity card 11 has only one service channel (not shown in the figure) in an active state, the service channel transmits the service data based on a data channel (not shown in the figure), the data channel is established by a service channel establishment control circuitry 121 and a radio resource establishment control circuitry 122 included in a communicate control module 12 based on a wireless connection with a network 2, the network 2 can include a wireless network, the subscriber identity card 11 can interact and communicate with a peer terminal (not shown in the figure) which initiates the service request based on the service channel, for the peer terminal of any amount, the terminal 1 can only maintain the communication with one peer terminal in the active state at the same time based on the service channel.

For example, when the subscriber identity card 11 is implementing a communication s1 based on the service channel currently, the terminal 1 receives a second service request s2 for the subscriber identity card 11, if the terminal 1 supports a communicate waiting function, the communicate control module 12 of the terminal 1 may maintain one communication in the active state through the service channel establishment control circuitry 121, and may implement a wait (or suspend), merge or release operation for another communication.

Wherein, the release operation includes, the communicate control module 12 refuses the second service request s2 if it still maintains the communication s1 in the active state; or, the communicate control module 12 can hang up the communication s1 and then respond to the second service request s2 according to the will of the subscriber identity card 11, if it confirms respond to the second service request s2.

The wait operation includes, if the communicate control module 12 confirms respond to the second service requests s2, the communicate control module 12 can execute step s5 according to the will (for example, by step s3, to remind the user who identified by the subscriber identity card 11 that the second service request s2 is received currently based on the subscriber identity card 11; then execute step s4: sending an instruction indicating accepting the second service requests s2 by the user) of the subscriber identity card 11, to switch the communication s1 into a wait (hold, also can be called keep) state and accept the second service request s2, revise the wireless resource s6 corresponding to the wireless connection based on the interaction between the radio resource establishment control circuitry 122 with the network 2, therefore establishing a second communication s7 in response to the second service request s2 successfully, at this point, the service channel establishment control circuitry 121 maintains the second communication s8 in an active state, the user can begin a communication s9 based on the second communication s8, but the communication s1 is in the wait state when the communication s9 is in the active state. The merge operation includes, the communicate control module 12 merges the communication s1 and the second service request s2 to be a meeting mode according to the instruction of the subscriber identity card 11.

Those skilled in the art can understand that, the wait operation in the existing technology needs to be done after consulting with the network 2, and only if the subscriber identity card 11 corresponding to the user consults with the network 2 successfully, can the communicate control module 12 continue to process the second service request s2.

Similarly, FIG. 2 schematically illustrates a typical scene diagram for a method of processing uplink multi-service requests according to the existing technology; wherein, the uplink can be a mobile originated call service request initiated by the user (not shown in the FIG. 2), the user is identified by a subscriber identity card 11. In this embodiment, similar to the embodiment shown in FIG. 1, the terminal 1 can only maintain one communication with one peer terminal in the active state based on the service channel one time.

For example, when the subscriber identity card 11 is implementing a communication s1 based on the service channel currently, the subscriber identity card 11 then sends another service request s2, the communicate control module 12 of the terminal 1 may maintain one communication in the active state through a service channel establishment control circuitry 121, and may implement a wait (or suspend), merge or release operation for another communication. Wherein, the release operation includes, the communicate control module 12 refuses the second service request s2 if it still maintains the communication s1 in the active state; or, the communicate control module 12 can hang up the communication s1, if it confirms respond to the second service request s2, and then respond to the second service request s2.

The wait operation includes, if confirming respond to the second service requests s2, the communicate control module 12 may switch the communication s1 into a wait (hold) state and send a request s3 for establishing a second service channel, and modify a wireless resource s4 corresponding to the wireless connection based on the interaction between the radio resource establishment control circuitry 122 with the network 2, therefore a second communication s5 in response to the second service request s2 is established successfully, at this point, the service channel establishment control circuitry 121 maintains the second communication s6 in the active state, the user can begin a communication s7 based on the second communication s6, but the communication s1 is in the wait state when the communication s7 is in the active state. The merge operation includes, the communicate control module 12 merges the communication s1 and the second service request s2 to be a meeting mode according to the instruction of the user corresponding to the subscriber identity card 11.

Similar to the embodiment shown in the FIG. 1 above, choice about the implement of the waiting operation or the hang-up operation according to the will of the subscriber identity card 11 can be determined.

Those skilled in the art can understand that, the wait operation in the existing technology needs to be done after consulting with the network 2, and only if the subscriber identity card 11 corresponding to the user consults with the network 2 successfully, the wait operation to the communication s1 can be successful, and can the communicate control module 12 continue to process the second service request s2.

Those skilled in the art should understand, communication of multi-channels which are all in the active state can not be realized by the embodiments shown in FIG. 1 and FIG. 2 illustrated above, which is disadvantageous to the operation experience of the user's daily communication.

Based on analysis, inventors found that, the above problems are caused because the existing solutions can allow a terminal to maintain only one communication in an active state at a same time.

To solve the problems in the existing techniques, embodiments of the present disclosure are provided. A terminal receives a service request corresponding to a current subscriber identity card, and responds the service request to establish a second service channel to communicate, when the current subscriber identity card is using a first service channel to communicate, wherein the first service channel and the second service channel are both established based on the current subscriber identity card, consequently the user's demand for implementing two or more routes of communication at the same time can be satisfied, and the user's experience is optimized greatly.

In order to clarify the object, solutions and advantages of embodiments of the present disclosure, embodiments of present disclosure will be described clearly in detail in conjunction with accompanying drawings.

Figure 3:
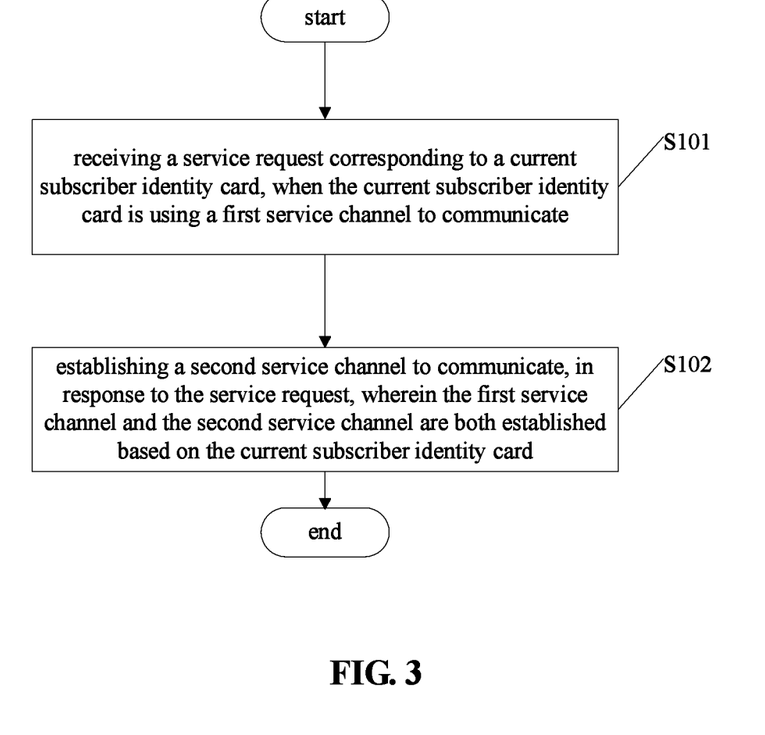
FIG. 3 schematically illustrates is flow chart of a method for processing services of a multi-channel terminal according to the first embodiment of the disclosure.

FIG. 3 schematically illustrates a flow chart of a method for processing services of a multi-channel terminal according to the first embodiment of the disclosure. Wherein the terminal may include a mobile terminal and may also include other terminal device capable of handling multi-channel service; the multi-channel may be two service channels at least, the two services channels at least transmit service data based on a data channel, which is established based on a wireless network.

Wherein the wireless network may include a network implemented by various connection modes such as 5G, 4G, 3G, 2G, and Wi-Fi and the like; the data channel may be a channel for transmitting data for various types of services, such as a data channel based on a IMS network, and further, for example, in service of Voice over LTE (referred to VoLTE), VoWIFI, the data channel may be a channel based on the channel corresponding to a Packet Data Network (IMS PDN) of the IP Multimedia Subsystem (IMS).

Specifically, in this embodiment, the step S101 is executed first: receiving a service request corresponding to a current subscriber identity card, when the current subscriber identity card is using a first service channel to communicate. More specifically, wherein the corresponding to the current subscriber identity card includes corresponding to a user identified by the subscriber identity card. Further, the service channel includes a channel for transmitting a service data such as a voice service data, a video service data, and the like. Further, the communication includes a voice communication, a video communication, and the like. More embodiments can be varied out by those skilled in the art according to practice, and detailed description is not provided herein after. Preferably, the subscriber identity card corresponds to the user. Preferably, the subscriber identity card has established a first service channel with the network based on the data channel, which is established based on a wireless network.

In a variation embodiment, a service request corresponding to the current subscriber identity card may also be received, during a process of the current subscriber identity card establishes or releases the first service channel.

And then proceeds to execute step S102: establishing a second service channel to communicate, to respond to the service request, wherein the first service channel and the second service channel are both established based on the current subscriber identity card. Specifically, the second service channel may be established in advance. More specifically, the first service channel and the second service channel may be established by the user based on the current subscriber identity card. In a preferred embodiment, the second service channel and the first service channel transmit a service data based on a data channel.

Further, the first service channel remains in an active state when responds the service request based on the second service channel. Those skilled in the art can understand that, the active state refers to a state in which a service data can be transmitted over a service channel.

Further, the first service channel and the second service channel are established based on a same service access mode. Wherein the service access mode may include a service access mode realized by a circuit switch, a service access mode realized by a packet switch, a service access mode realized by basing on a IP multimedia subsystem (IMS), a service access mode realized by a IP network.

Further, wherein services the service request for include a voice service and a video service.

Further, wherein the service request includes a service request based on a IMS network, wherein services the service request for and services the first service channel corresponding to both include a service based on the IMS network (IP Multimedia Subsystem).

Further, wherein services the service request for include a VoLTE service or a VoWIFI service.

Further, wherein the first service channel and the second service channel data transmit a service data based on a data channel, which is established based on a wireless network.

Further, wherein the data channel is a data channel based on the IMS network. For example, in a VoLTE service, the data channel based on the IMS network includes a channel corresponding to an IMS PDN.

Further, the first service channel and the second service channel correspond to different ports of the data channel. Those skilled in the art can understand that, unlike the existing technology, embodiments of the present disclosure preferably establish a plurality of service channels based on the same data channel, which are distinguished by different ports. For example, in a VoLTE service, the different ports may be established on a channel corresponding to the same IMS PDN, to obtain multiple service channels.

Further, the service request may be a mobile terminated call service request for the current user, or may be a mobile originated call service request initiated by the current user. Preferably, the current user is identified by the current subscriber identity card.

From above, by implementing the method of the first embodiment, compared with the existing service processing method which the terminal can only maintain one service channel in the active state at a same time, one subscriber identity card can establish service channels which at least two of them are in the active state at the same time of embodiments of the present disclosure, consequently the user's demand for implementing two or more routes of communication at the same time can be satisfied, and a processing logic for the multi-channel service is optimized, so that the first service channel remains active when responses to the service request based on the second service channel, which facilitates responding to the current user much faster, and the user experience is optimized greatly.

Figure 4:
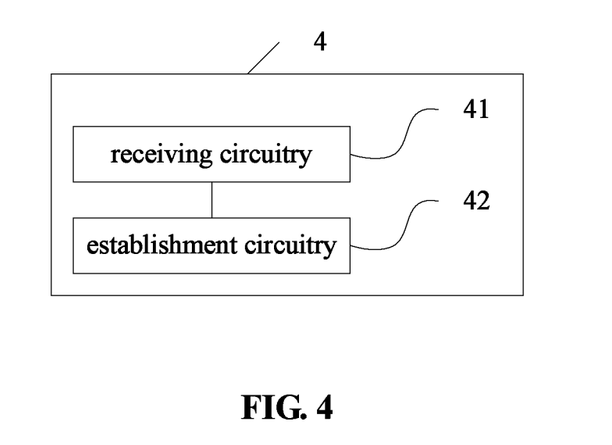
FIG. 4 schematically illustrates a structural diagram of a device for processing services of multi-channel terminal according to the second embodiment of the disclosure.

FIG. 4 schematically illustrates a structural diagram of a device for processing services of a multi-channel terminal according to the second embodiment of the disclosure. Those skilled in the art can understand that, the device 4 for processing services of a multi-channel terminal of the present disclosure is used to implement the method illustrated in the embodiment shown in the FIG. 3. Specifically, in the present embodiment, the device 4 for processing services of a multi-channel terminal includes a receiving circuitry 41, which is configured to receive a service request corresponding to a current subscriber identity card, when the current subscriber identity card is using a first service channel to communicate; and an establishment circuitry 42, which is configured to establish a second service channel to communicate, to respond to the service request, wherein the first service channel and the second service channel are both established based on the current subscriber identity card.

Preferably, wherein the first service channel remains in an active state when the establishment circuitry 42 establishes the second service channel to communicate.

Preferably, the first service channel and the second service channel are established based on a same service access mode.

Preferably, the service request includes a mobile terminated call service request for the current user or a mobile originated call service request initiated by the current user, wherein the current user is identified by the current subscriber identity card.

Preferably, services the service request for include a voice service and a video service.

Preferably, the service request includes a service request based on a IMS network, wherein services the service request for and services the first service channel corresponding to both include a service based on the IMS network.

Preferably, services the service request for include a VoLTE service or a VoWIFI service.

Preferably, the first service channel and the second service channel data transmit a service data based on a data channel, wherein the data channel is established based on a wireless network.

Preferably, the data channel is a data channel based on the IMS network.

Preferably, the data channel based on the IMS network includes a channel corresponding to an IMS PDN.

Preferably, the first service channel and the second service channel correspond to different ports of the data channel.

In a variation embodiment, during the process that the current subscriber identity card establishes or releases the first service channel, the device 4 for processing services of a multi-channel terminal may receive a service request corresponding to the current subscriber identity card, based on the receiving circuitry 41 and the establishment circuitry 42.

More details regarding the operation principle and operation mode of the device 4 for processing services of a multi-channel terminal can refer to the description about the FIG. 3 above, and detailed description is not provided herein after.

Figure 5:
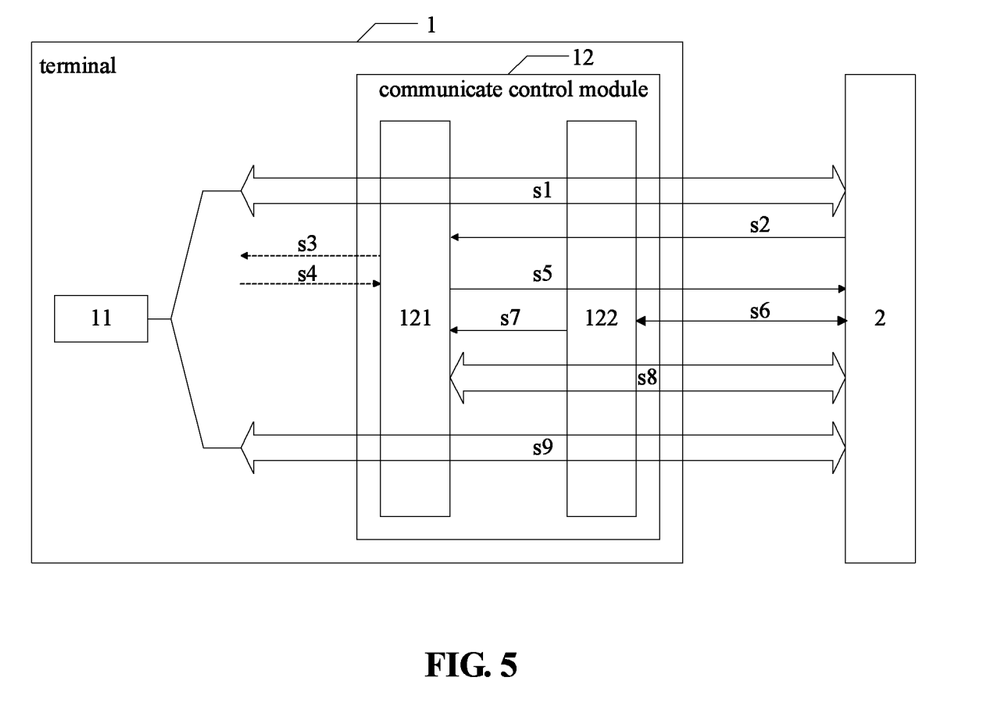
FIG. 5 schematically illustrates a typical scene diagram for a method for processing multi-channel terminal according to the embodiment of the disclosure.

FIG. 5 schematically illustrates a typical scene diagram for a method of processing multi-channel terminal service according to the embodiment of the disclosure. Wherein the terminal 1 may be a mobile terminal in which a subscriber identity card 11 is provided for identifying a user (not shown in FIG. 5); the service request includes a mobile terminated call service request for the user.

In this present application scene, the service request is transmitted to the terminal 1 based on the network 2. The network 2 may include a wireless network for establishing a wireless connection, and may also include a service network for providing a service for the terminal 1; the wireless network may be implemented by a public mobile communication network such as 5G, 4G, 3G or GPRS, also may be a wireless local area network (Wi-Fi), and the like. Those skilled in the art can understand that, a network using a radio wave as a transmission medium can be used as a wireless network in embodiments of the present invention, and detailed description is not provided herein after.

Further, services the service request for include a voice service and a video service based on the network 2, and the like.

Further, a voice service, video service, short message and other services based on the 4G long-term evolution (LTE) network can be regarded as a VoLTE service; and a voice service, video service, short message and other services based on the Wi-Fi network, can be regarded as a VoWIFI service.

Further, the service network corresponds to the service request. For example, the service network is an IP Multimedia Subsystem (IMS) network based on the IP, when the service request is a VoLTE service request or a VoWIFI service request Further, the terminal 1 establishes a Packet Data Network (PDN) for transmitting data with the IMS network, which means establishing a data channel with the IMS network. In some embodiments, the data channel may be a channel corresponding to the IMS PDN, and the channel corresponding to the same IMS PDN may establish at least two service channels, which corresponds to different ports of the channel corresponding to the IMS PDN.

In a typical application scene, two service channels are established by the subscriber identity card 11 in the terminal 1 (not shown in FIG. 5), wherein one service channel (hereinafter referred to be a first service channel) transmits a service data (not shown in FIG. 5) through a first data port (not shown in FIG. 5), and another service channel (hereinafter referred to be a second service channel) transmits a service data (not shown in FIG. 5) through a second data port (not shown in FIG. 5) using the same data channel, the two service channels can transmit service data using the data channel at a same time. Preferably, the data channel is established by the service channel establishment control circuitry 121 and the radio resource establishment control circuitry 122 included in the communication control module 12 based on a wireless connection with the network 2. For example, in the VoLTE service, the data channel may be a channel corresponding to the IMS PDN.

When the subscriber identity card 11 implements a first communication s1 using the first service channel, and the terminal 1 receives another mobile terminated call service request s2 for the user (not shown in FIG. 5) identified by the user identification card 11, then the communicate control module 12 may respond to the mobile terminated call service request s2 based on the second service channel, in order to turn on a second phone call s9 promptly. Since the second phone call s9 and the first communication s1 are carried out on different service channels respectively and don't collide with each other, so that the first service channel corresponding to the first call s1 can still remain in an active state, which can improve the operation experience of both side of the communication effectively.

Specifically, when receiving the mobile terminated call service request s2, the terminal 1 can receive and respond to the mobile terminated call service request s2 directly based on the second service channel, and is not affected by the first communication s1 during this process, and any restriction or modification to the first call s1 is not necessary.

In the VoLTE service, the service channel establishment control circuitry 121 executes step s5, to accept the mobile terminated call service request s2, on the basis of maintaining the first communication s1 normally, and the radio resource establishment control circuitry 122 interacts with the network 2 based on an existing wireless network (the wireless network is used to establish the data channel for the service channel establishment control circuitry 121 and the radio resource establishment control circuitry 122, to interact with the network 2 to transmit the data), to modify a reconfigured radio resource and prepare a wireless resource s6 for the second service channel, when the radio resource establishment control circuitry 122 prepares a wireless resource s7 for the communication of the second service channel successfully, a channel s8 of the second communication has been established successfully between the terminal 1 and the network 2, at this time, the user can start the second communication s9 based on the subscriber identity card 11 with the network, and the first communication s1 is still in a normal call state at the same time.

In a variation embodiment, the terminal 1 may indicate to the user that the mobile terminated call service request s2 is received by the step s3, and set an instruction s4 the user sends to receive the mobile terminated call service request s2 as a prerequisite for executing the step s5.

Figure 6:
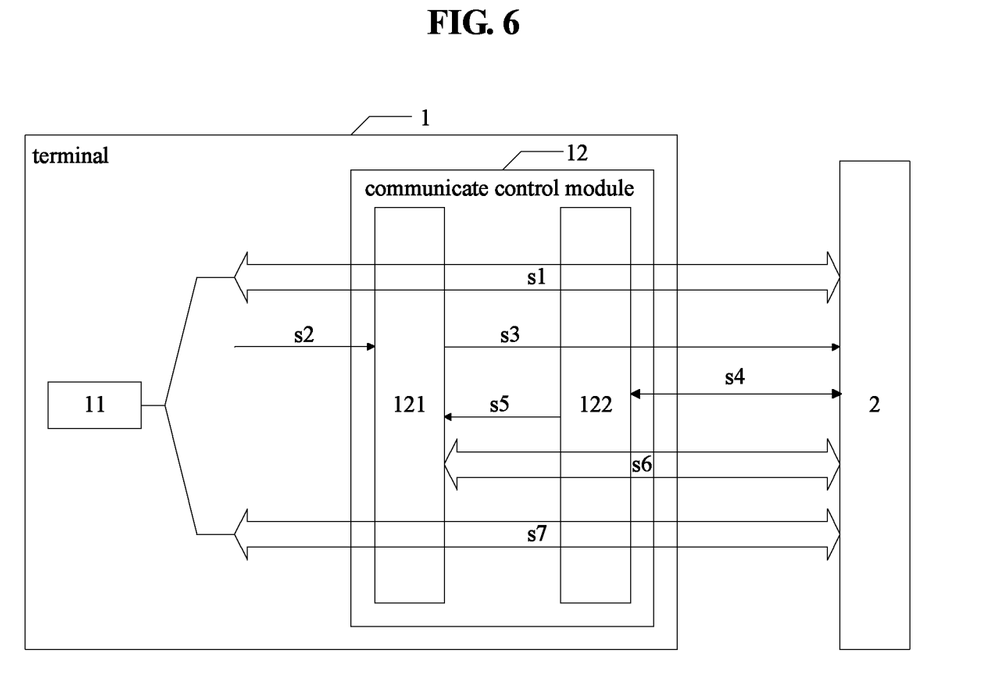
FIG. 6 schematically illustrates another typical scene diagram for a method of processing the multi-channel terminal service according to the embodiment of the disclosure.

Similarly, in another typical scene diagram for the method of processing the multi-channel terminal service according to the embodiment of the disclosure shown in FIG. 6, the service request includes a mobile originated call service request initiated by the user.

In the typical application scene shown in FIG. 6, the terminal 1 establishes two service channels (not shown in FIG. 6) for the subscriber identity card 11 based on the communicate control module 12 in advance, the detailed establishment process can be referred to the description of FIG. 5 above by those skilled in the art, and detailed description is not provided herein after.

In the VoLTE service, when the subscriber identity card 11 implements the first communication s1 using the first service channel (not shown in FIG. 6), the subscriber identity card 11 initiates another call service request s2, then the communicate control module 12 initiates a setup request s3 for establishing the second communication through the second port based on the service channel establishment control circuitry 121, and the radio resource establishment control circuitry 122 interacts with the network 2, and when the radio resource establishment control circuitry 122 successfully prepares the radio resource s5 for the call of the second service channel, the channel s6 of the second communication is successfully established between the terminal 1 and the network 2, and at the time, the user may start the second communication s7 with the network based on the subscriber identity card 11, and the first communication s1 is still in the normal call state at the same time.

It should be noted that, although embodiments that a single subscriber identity card included in a terminal are only illustrated above, however, embodiments of the present disclosure are not limited to a terminal with a single subscriber identity card, embodiments of this disclosure can also be implemented to a terminal with multiple subscriber identity cards, for example, a terminal which supports a plurality of subscriber identity cards, as long as at least one of the subscriber identity cards can establish multiple service channels which all are in an active state at the same time.

Those skilled in the art can understand that all of or a portion of the processes in the method provided in the above embodiments can be implemented by related hardware with instruction of computer program. The computer program may be saved in a readable storage medium, and include the processes of the method provided in the above embodiments when it is executed. The readable storage medium may be a magnetic disk, an optical disk, a Read-Only Memory (ROM) or a Random Access Memory (RAM).

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for processing services of a multi-channel terminal, comprising:
   receiving a service request corresponding to a current subscriber identity card, when the current subscriber identity card is using a first service channel to communicate; and
   establishing a second service channel to communicate, in response to the service request,
   wherein the first service channel and the second service channel are both established based on the current subscriber identity card;
   wherein the first service channel remains in an active state when the second service channel is established to communicate, and the first service channel and the second service channel are established based on a same service access mode, wherein the service access mode comprises a service access mode realized by a circuit switch, a service access mode realized by a packet switch, a service access mode realized by basing on an IP (Internet Protocol) multimedia subsystem, or a service access mode realized by an IP network.

2. The method according to claim 1, wherein the service request comprises a mobile terminated call service request for the current user or a mobile originated call service request initiated by the current user, wherein the current user is identified by the current subscriber identity card.

3. The method according to claim 1, wherein services the service request for comprise a voice service or a video service.

4. The method according to claim 1, wherein the service request comprises a service request based on an IMS network, wherein services the service request for and services the first service channel corresponds to both comprise a service based on the IMS network.

5. The method according to claim 4, wherein services the service request for comprise a VoLTE service or a VoWIFI service.

6. The method according to claim 1, wherein the first service channel and the second service channel transmit a service data based on a data channel, which is established based on a wireless network.

7. The method according to claim 6, wherein the data channel is a data channel based on the IMS network.

8. The method according to claim 7, wherein the data channel based on the IMS network comprises a channel corresponding to an IMS PDN.

9. The method according to claim 8, wherein the first service channel and the second service channel correspond to different ports of the data channel.

10. A device for processing services of a multi-channel terminal, comprising:
  a receiving circuitry, configured to receive a service request corresponding to a current subscriber identity card, when the current subscriber identity card is using a first service channel to communicate; and
  an establishment circuitry, configured to establish a second service channel to communicate, to respond to the service request, wherein the first service channel and the second service channel are both established based on the current subscriber identity card;
wherein the first service channel remains in an active state when the second service channel is established to communicate, and the first service channel and the second service channel are established based on a same service access mode, wherein the service access mode comprises a service access mode realized by a circuit switch, a service access mode realized by a packet switch, a service access mode realized by basing on an IP (Internet Protocol) multimedia subsystem, or a service access mode realized by an IP network.

11. The device according to claim 10, wherein the service request comprises a mobile terminated call service request for the current user or a mobile originated call service request initiated by the current user, wherein the current user is identified by the current subscriber identity card.

12. The device according to claim 10, wherein services the service request for comprise a voice service and a video service.

13. The device according to claim 10, wherein the service request comprises a service request based on an IMS network, wherein services the service request for and services the first service channel corresponding to both comprise a service based on the IMS network.

14. The device according to claim 13, wherein services the service request for comprise a VoLTE service or a VoWIFI service.

15. The device according to claim 10, wherein the first service channel and the second service channel transmit a service data based on a data channel, wherein the data channel is established based on a wireless network.

16. The device according to claim 15, wherein the data channel is a data channel based on the IMS network.

17. The device according to claim 16, wherein the data channel based on the IMS network comprises a channel corresponding to an IMS PDN.

18. The device according to claim 17, wherein the first service channel and the second service channel correspond to different ports of the data channel.

* * * * *